United States Patent [19]

Baratto

[11] E Re. 30,891

[45] Reissued Mar. 30, 1982

[54] RESILIENT WOOD REPLICATION

[75] Inventor: Eugene L. Baratto, White Bear Township, Ramsey County, Minn.

[73] Assignee: Minnesota Mining and Manufacturing Company, Saint Paul, Minn.

[21] Appl. No.: 171,756

[22] Filed: Jul. 24, 1980

Related U.S. Patent Documents

Reissue of:

[64] Patent No.: 4,103,056
Issued: Jul. 25, 1978
Appl. No.: 705,161
Filed: Jul. 14, 1976

[51] Int. Cl.[3] ..... D06N 7/04

[52] U.S. Cl. ..... 428/142; 428/53; 428/141; 428/151; 428/106; 428/425.1; 428/424.2; 428/423.3

[58] Field of Search ..... 428/53, 58, 106, 47–50, 428/141, 142, 151, 156, 161, 425.1, 424.2

[56] References Cited

U.S. PATENT DOCUMENTS 3,272,098 9/1966 Buchholtz et al. ..... 404/32
3,546,148 12/1970 Diamond et al. ..... 260/18 TN
3,776,752 12/1973 Graver ..... 427/273
3,908,053 9/1975 Hettich ..... 428/58
3,946,530 3/1976 O'Grady ..... 428/106

OTHER PUBLICATIONS

Kovaly, A Handbook of Plastic Furniture Manufacture Technomic Pub., 1970, pp. 14, 21, 45, 46, 79 and 81.

*Primary Examiner*—George F. Lesmes
*Assistant Examiner*—Alexander S. Thomas
*Attorney, Agent, or Firm*—Cruzan Alexander; Donald M. Sell; Richard Francis

[57] ABSTRACT

Resilient wood replication especially suited for use as floor covering is provided by a thick resilient elastomeric polyurethane base having a wood-stained molded textured wood-grain surface which is overcoated with a clear, tough, abrasion-resistant, flexible, water-resistant polyurethane protective coating. A preferred configuration of the resilient wood replication is a floor tile having opposed mating ends and two parallel sides and a surface configuration having a grain appearance of a plurality of parqueted natural wood pieces. A multiplicity of the tiles can be applied to the floor with complimentary ends fitted together to provide a continuous mass of tile having the actual lines between separate tiles virtually indistinguishable to the casual observer.

7 Claims, 2 Drawing Figures

RESILIENT WOOD REPLICATION

Matter enclosed in heavy brackets [ ] appears in the original patent but forms no part of this reissue specification; matter printed in italics indicates the additions made by reissue.

BACKGROUND OF THE INVENTION

Smooth floor coverings have ancient origins. In the Bronze Age(1600–1000 BC) water-worn pebbles were laid as floorings in Crete and also on the Green mainland. The Greeks, refining this technique between the sixth and the fourth centuries BC, installed decorative pebble mosaics. Such mosaics were also made from marble, serpentine alabaster, some forms of granite, and other stones suitably polished. Timber flooring, originally used in rough form for a strictly functional purpose, was eventually made into smooth boards, and was later used decoratively in the parquetry designs.

In recent times, the use of finished wood floors has declined in favor of linoleum, asbestos tile, vinyl tile floor tile and carpeting, due to the ease of maintaining all of these materials and due to the soft warm feeling underfoot of the last-named. The warm and luxurious appearance of finished wood flooring has been recognized and is still recognized among those who appreciate quality construction and fine building materials. There have been attempts to make floor coverings of synthetic materials such as plastic which resemble wood but these have generally been inadequate for one or more reasons. For example, some wear poorly due to the inability of the material selected to withstand the punishment inflicted by normal walking traffic and any of a variety of activities normally carried on on the floor of the home or commercial building. Others merely resemble wood, appearing even to the casual observer as being a wood simulation. Attempts have been made to make smooth-surfaced flooring materials more resilient underfoot to give a more luxurious, comfortable feel but these attempts have been inadequate due to the deficiencies in physical properties of the materials selected. For example, many rubbery materials contain fillers which interact with materials present in the atmosphere such as moisture, causing undesirable buckling and distortion. This situation would create a tripping hazard which would be intolerable if such an item were used to cover floors, especially where water is commonly present, for example, on walkways near the entrances of buildings.

SUMMARY OF THE PRESENT INVENTION

The present invention provides a unique, aesthetically attractive functional resilient wood replication which can be employed as a floor covering material and which avoids problems described above. The replication of the invention is provided by a resilient, elastomeric polyurethane base having a molded textured wood-grain surface which is coated with wood stain to resemble wood and overcoated with a clear, tough, abrasion-resistant, flexible, water-resistant polyurethane protective coating. The preferred configuration of the resilient wood replication of the invention is a floor tile having two mating ends and two parallel sides and a surface configuration having a wood-grain appearance of a plurality of parqueted natural wood pieces. One mating end of the tile has a male end portion and the opposite end is a complimentary female end portion such that a multiplicity of the tiles can be applied to a floor with the tiles mated together to provide an integral parquet floor design with the actual lines between separate tiles being virtually indistinguishable to the casual observer.

The resilient wood replication of the invention has a unique feel when walked upon which may be likened to walking on a layer of soft resilient rubber, providing an extremely comfortable surface underfoot. Additionally, the unique product of the invention has the warm and luxurious look of wood, it being virtually indistinguishable from real wood, yet much easier to apply and maintain. Moreover, the product of the invention is not subject to problems normally present with wood, such as being sensitive to water which causes wood to expand, contract, crack and discolor.

BRIEF DESCRIPTION OF THE DRAWING

Understanding of the invention will be facilitated by referring to the accompanying drawing wherein.

PRESENTLY PREFERRED EMBODIMENT

Figure 2:
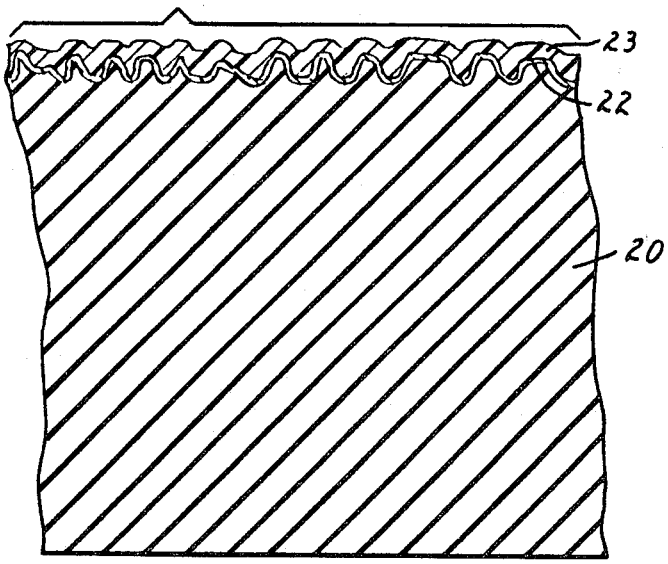
FIG. 2 is a greatly enlarged fragmentary sectional view of the article of FIG. 1 taken at line 2—2.

As depicted in FIG. 2, the resilient wood replication of the invention is formed of a thick resilient elastomeric polyurethane base 20 having a molded textured wood-grain surface 21 which is coated with wood stain 22 and overcoated with a clear, tough, abrasion-resistant, flexible polyurethane protective coating 23.

A preferred embodiment of the resilient wood replication of the invention is a floor tile, most preferably in the shape shown in FIG. 2. As shown, the preferred floor tile has parallel sides 10 and 11 and mating ends. The preferred mating end has male portion 12 which resembles an arrowhead with a complementary female portion 13. This configuration is arrived at by forming the tile which is an integral structure appearing as having a set of pieces arranged with two crossed diagonal pickets, triangular pieces between two opposed spaces formed by the cross configuration of the pickets, and a square piece 18 in another space of the cross, with the remaining space being capable of accommodating that triangular part of square piece 18 which protrudes beyond the generally square shape of the main body of the tile. Each picket is pointed on its ends to provide 90° angles which form the corners of the tile where these pieces terminate. One picket appears to be bisected by and have its midportion interrupted by the other picket.

Figure 1:
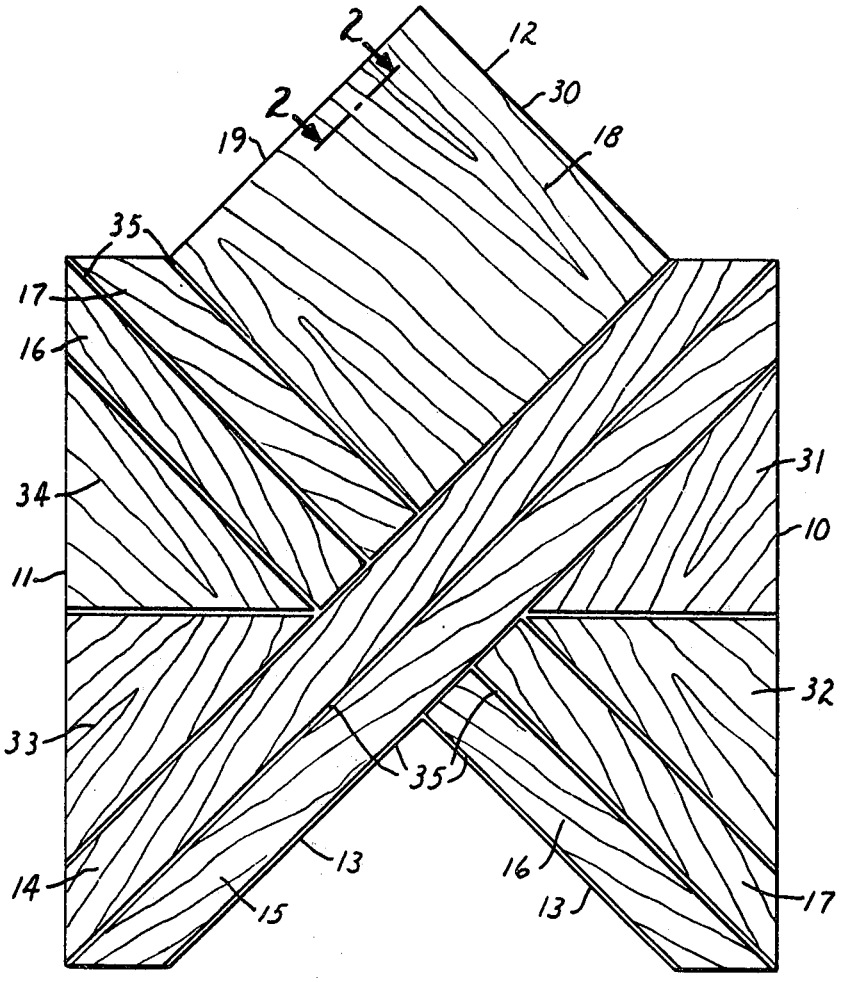
FIG. 1 is a plane view of one embodiment of the resilient wood replication of the invention in the form of a floor tile.

Each of the pickets may be divided along on its longitudinal axis as shown in FIG. 1 to give the design more interesting lines, providing picket parts 14 and 15 along one diagonal and picket parts 16 and 17 along the other diagonal. Square shaped piece 18 lies with one side adjacent piece 14 and an adjacent side abutting piece 17 to complete the male end of the tile, exposing edges 19 and 30 to provide end 12.

Each of the triangles which fit within the opposed spaces of the triangular spaces within the crossed picket configuration may also be divided, to provide more design detail, by a line perpendicular to their hypotenuse providing equal smaller triangles 31 and 32 and 33 and 34, respectively.

The pieces preferably do not fit immediately adjacent to one another but are separated by a small depression 35 which may be stained the darker color than the remaining surface of the tile. Preferably the wood-grain pattern in the pieces runs in the longitudinal direction where the pieces are elongate (e.g., pieces 14, 15, 16 and 17), with the grain of the remaining pieces preferably running as shown in FIG. 1. Such an arrangement of the wood grain in parquet tile is well known in the art of wood parquet flooring.

DETAILED DESCRIPTION

The polyurethane material forming the elastomeric base of the wood replication of the invention is initially liquid and capable of being cured to a product which is flexible, durable and tough, fairly resilient, and water-resistant. (By water-resistant is meant the material should not undergo any appreciable dimensional changes upon immersion in water). This material should also, in the liquid state, have the ability of filling fine depressions in a mold, and be capable of nearly perfectly reproducing a counterpart of the mold's surface on its surface upon curing.

Suitable cured polyurethane elastomer compositions for use in the article of the invention will have an elongation of at least 50%, preferably from 90% to 150% and a tensile strength of at least about 100 psi, preferably from 120 to 700 as measured by ASTM D-412. To provide the proper feel underfoot, the polyurethane elastomer should preferably have a hardness value within the range of about 20 to 90 Shore A durometer. The polyurethane elastomer composition should also be resistant to permanent deformation at temperatures in the range of about −30° to +70° C. to retain its desired shape. Compressive strength as measured by ASTM D-575 Method A should preferably range from 150–4000 psi at 50% deflection. Tear strength as measured by ASTM test D-624 preferably exceeds 20 lbs. per inch thickness.

The elastomeric layer has a minimum thickness of 30 mils to provide the necessary resilience and supporting surface for use as a floor tile. Typical thicknesses for this base layer will be on the order of 100 to 250 mils for floor covering applications. Other shaped articles as hereinafter described may have a thicker elastomeric base layer.

A preferred polyurethane elastomer material for this purpose may be formed by a *filled* pourable reaction mixture of poly(oxypropylene)polyol and an organic polyisocyanate with a suitable crosslinking catalyst.

Pourable reaction mixtures of poly(oxyalkylene)-polyol and organic polyisocyanate which harden from a liquid state to a solid elastomeric state under ambient temperatures and pressures may be readily formed by mixing approximately equivalent quantities, i.e., 0.8:1 to about 1.2:1, of organic, and preferably aromatic, polyisocyanate, and polymeric poly(oxyalkylene) polyol, and preferably 1,2-propylene oxide derived polyols. The reaction mixtures are preferably reacted in the presence of a suitable polyol-soluble metal catalyst for the reactants so that the reaction proceeds at ambient temperatures with great rapidity, e.g., one hour or less from a liquid to a substantially completely reacted solid state.

A number of soluble metal compounds have been found to catalyze such reaction mixtures under ambient conditions as for example, organo-tin compounds, lead salts of carboxylic acids, mercuric compounds, a combination of a calcium or lead salt of a carboxylic acid, such as calcium or lead octoate, an ionizable monoorgano-mercuric compound, such as phenyl mercuric acetate, and lead oxide. The total amount of the catalyst should not be less than about 0.1% of the reaction mixture, and, to hasten the setting-up of hardening time desired, may be adjusted upwardly to about 3%; or to such higher percentage as desired before the accelerating effect is lost or undesirable side effects beome apparent.

For the elastomer to form [as] a tough, wear and abrasion resistant rubbery product, some trifunctionality may be desired to facilitate cross-linking of the reactants as well as chain extension thereof. This is readily accomplished by including some triisocyanate or triol or both in the reaction mixture. Thus, for example, when the reaction mixture is comprised essentially of an aromatic diisocyanate and polypropylene glycol a certain amount of trifunctionality can be built in very readily by pre-reacting from 5% to 15% of a triol such as trimethylol propane with the aromatic diisocyanate to form some triisocyanate or by including as part of the monomer charge for making the starting polymeric polyol from about 5% to 15% of a triol such as trimethylol propane, glycerine or the like. The resulting hardened product is a result of the one stage continuous reaction of this reaction mixture.

The elastomeric composition may contain up to about 75% by weight of a finely divided inert inorganic filler to reduce cost. The fillers should be selected to be inert in an elastomeric composition in the environment selected for use for the ultimate article. For example, a resilient wood replication containing a moisture-sensitive filler would be unacceptable because, in some instances, such moisture susceptibility may cause the article to swell or increase in size, causing it to buckle where it is in a confined location such as an inlaid floor covering. The fillers are finely divided, i.e., are in the form of powders or powder-like substances with the particles in very fine size ranges, smaller than about 100 microns and generally less than about 10 microns. Preferred fillers include silica, dried calcium carbonate and the like.

The molded wood-grain surface of the base layer is provided by casting the liquid polyurethane precursor in a suitable mold which has a negative pattern corresponding *to* the wood-grain desired. For this purpose, flexible molds made of RTV silicone rubber have been found to be especially suitable. Such molds may be prepared by pouring liquid silicone polymer into a suitable vessel containing a wood original, curing the polymer, and removing the wood.

The stain employed to provide the color or pigmentation to the textured surface of the elastomeric base of the article of the invention may be either the penetrating type or the wiping type. Such stains are water- or solvent-soluble dyes, or chemically reactive agents which normally color wood. These materials have been found to also color the polyurethane compositions forming the elastomeric base layer of the article of the invention. Such stains typically are formed of synthetic or naturally occurring chemical compounds in a liquid vehicle which may also contain a small amount of binder. Dyeing type stains are not preferred because they stain polyurethane elastomeric poorly, staining its surface a monotone rather than providing the contrasting tones that one would expect from wood.

The penetrating type stain typically contains a liquid vehicle organic or aqueous solvent, pigment and a polymeric material such as nitrocellulose, ethyl cellulose or an acrylate binder. Such penetrating stains are painted on the surface and permitted to dry by evaporation of the vehicle and require no curing of the polymeric binder. Wiping stains on the other hand contain a drying oil base and pigment in a liquid vehicle. Typically, the drying oil base is linseed oil or an alkyd oil. As the name [applies] *implies*, the wiping type stain usually does not penetrate, but it is applied and remains on the surface much in the same manner as paint. Upon exposure, the liquid vehicle of the wiping stain evaporates, if one is used, and the drying oil polymerizes to form a non-tacky pigmented polymeric layer on the surface of the article being stained. Such stains typically will produce stained articles according to the invention in colors such as walnut, cherry, mahogany, pecan and the like. Virtually any desired color may be produced by the selection of the appropriately pigmented stain. Unlike [when] staining wood, the product of the invention stains quite uniformly because there are no areas on the surface of the elastomeric base which are more porous than other areas, as is typically found in wood.

Some stain formulations which have been found to be especially suitable include [that] *those* sold under the trade identification "Natural Walnut 46-506" by the Elliot Paint and Varnish Company of Chicago, Illinois, "American Walnut Stain" by the Colony Paints Division of Conchem Company, Inc., "Spiced Walnut, Blondit Wood Finish" by James B. Day and Company and "American Walnut 640.00, Penchrome" by the O'Brien Corporation.

The polyurethane protective coating covering the wood-grain textured surface of the article of the invention is formed of a polymeric material which has good adhesion to the stained surface of the polymeric elastomer even under high stress, multiple flexing use, is highly abrasion resistant, flexible, transparent, water resistant and tough. For this purpose, the polyurethane forming this coating should have an elongation of [from] about 200 to 600% and a tensile strength of at least about 1500 psi. The thickness of the polyurethane protective coating should be no less than 1 mil to provide the proper protection for the surface of the elastomeric base. Typical thickness for this layer will vary within the range from about 2 mils to about 20 mils. The protective coating may be applied in a thickness sufficient to obviate any surface roughness on the texture surface of the elastomer base. This may be desired where a completely smooth floor covering is desired, for ease of cleaning.

An especially useful polyurethane protective coating may be formed of a prepolymer prepared by reacting [poly(oxypropylene) glycol] *polytetramethylene ether diol*, poly(oxypropylene) triol and [polymethylene polyphenyl isocyanate] *methylene cyclohexyl diisocyanate* and reacting this prepolymer in the presence of moisture with an amine-terminated polyether hydrofuran.

Other useful polyurethane protective coating formulations include the following commercially available materials: (1) elastomeric polyurethane lacquer available from the Spencer Kellogg Company under the trade designation "DV 1666"; (2) polyurethane elastomer adhesive composition available from the Spencer Kellogg Company under the trade designation "XP 2519"; and (3) polyurethane elastomeric lacquer composition sold under the trade designation "Permuthane" by the Beatrice Chemical Company.

Some commercially available polyurethane compositions which have been found to be unacceptable include the following: (1) polyurethane composition sold by Spencer Kellogg Company under the trade designation "M 21"; and (2) polyurethane composition sold by the Spencer Kellogg Company under the trade designation "M 22". The latter two compositions wrinkled the surface of the resilient wood replication article when it was subjected to stress.

While the general tenor of the foregoing has been to indicate utility of the resilient wood replication of the invention as being useful as a floor tile, the article of the invention, appropriately shaped, is useful for any of a wide variety of purposes. For example, the article of the invention may be shaped in the form of casings for windows or doors, baseboard molding, floor planking, wall covering, chair rails, decorative parts, picture frames, and the like. Modifications may be made in any of the articles mentioned above without departing from the scope of the invention. For example, the floor tile may be coated with pressure sensitive adhesive or other adhesive on its bottom side for ease of mounting and designs other than those described for the floor tile may be also employed. The floor tile may also be fitted with a foam backing to give it even more resilience or it may be made using a foamed polyurethane elastomer as a base.

The invention is further illustrated by reference to the following examples, in which all parts and percentages are by weight unless otherwise noted.

EXAMPLE 1

A wood original was prepared by cutting pieces of ¾ inch thick oak in shapes substantially the same as those comprising the tile shown in FIG. 1 and permanently adhering them to a plywood backing in the arrangement shown in FIG. 1. The surface of the oak was brushed with a rotary wire brush to enhance the wood grain. Wooden strips 9/16 inch thick and ½ inch wide were then fastened to the plywood backing to form a continuous ridge adjacent the peripheral edge of the wood original, and additional wooden strips 1 inch thick and ½ inch wide were fastened to the plywood adjacent the aforementioned ridge to form the outer edges of a mold cavity to retain curable liquid silicone material which would be cured to form the flexible mold. The mold was then prepared by pouring sufficient room temperature vulcanizable (RTV) silicone resin sold under the trade designation "Silastic" J RTV to fill the cavity and completely cover the wood original, permitting the silicone liquid resin to cure for approximately 24 hours at room temperature and then separating the silicone rubber mold from the wood original. Several molds were prepared in this manner and attached end to end on an endless belt.

The liquid polyurethane precursor material which on curing would form the polyurethane elastomer base was prepared of the following ingredients:

| Part A | |
|---|---|
| Ingredients | Parts |
| Polypropylene glycol having a molecular weight of 2000 | 31.8 |
| $SiO_2$ filler having a particle size on the average of 2.8 microns | 67.3 |

-continued

| | |
|---|---|
| Phenyl mercuric acetate catalyst | 0.15 |
| Butylated hydroxy toluene (sold under the trade designation "Ionol") | 0.10 |
| $TiO_2$ pigment | 0.65 |
| Part B | |
| Ingredients (per 100 parts Part A) | |
| Polyphenylene polyisocyanate having an equivalent weight of 135 (sold under [Ingredients (per 100 parts Part A)] the trade designation "Mondur" MRS) | 5.3 |

The Part A ingredients were blended in a paddle mixer for approximately one hour to form a homogeneous mixture which was degassed to remove entrapped air and moisture and then pumped into a mixing head where the Part B ingredient was added with additional mixing. The resultant mixture was then pumped into an extruding head fitted with a die having a 20 inch wide rectangular extrusion orifice capable of filling the molds to a thickness of about 185 mils. The filled molds were then passed through a forced air oven heated at about 120° C. for a dwell time of about 10–20 minutes to cure the polyurethane elastomer. The cured elastomer had a Shore A hardness of 81, a tensile strength of 373 psi, a 132% elongation at break, and a tear strength of 66 lbs. per inch thickness.

The cured elastomer shape was removed from the mold, and then conveyed wood-grain-textured-surface down into a dip coater station where a soya alkyl resin based walnut stain was applied, the excess stain wiped from the stained surface and the resultant stain coating dried at about 120° C. for 5 to 10 minutes. The dried stained textured surface was then passed through a curtain coating station to provide a dry coating weight of from 4 to 8 mils of a polyurethane protective coating. The curtain coater was that manufactured by the Gasway Division of the Wolverine Pentromix Inc. of Chicago, Illinois. The polyurethane protective coating formulation consisted of the following ingredients:

Polyurethane Protective Coating Formulation

| Part A<br>Ingredient | Parts |
|---|---|
| Solvent - a narrow range of mid- to high boiling hydrocarbons having 94% aromatic and 4% aliphatic constituents with a 100° C. flash point | 49. |
| Polytetramethylene ether diol having a molecular weight of 1000 | 17. |
| Poly(oxypropylene) triol having a molecular weight of 450 | 1.5 |
| Glycol mono-acetate (approx.) | 7. |
| Polyvinyl chloride powder flattening agent (sold under the trade designation "Marvinol" 53) | 2.3 |
| Sodium silicate (sold under the trade designation "Syloid" 244) [4.8] | 4.8 |
| Bentonite Clay thickening agent (sold under the trade designation "Bentone" 34) | 0.8 |
| Dibutyl tin dilaurate | 0.03 |
| 1,1,1 Trichloroethane | 6.7 |
| Methylene bis(4,4'-cyclohexyl isocyanate) | 10.4 |
| Part B | |
| Amine-terminated polyether hydrofuran solution 21.3% solids in toluene (sold under the trade designation "EPX" polymer solution) | 54. |
| Solvent - described in Part A | 43. |

-continued

| | |
|---|---|
| Triethylene diamine | 1.3 |
| Dibutyl tin dilaurate | 1.3 |

The dried polyurethane protective coating had an elongation of 300–350% and a tensile strength of 4600 psi. Wear resistance evaluation of this cured polyurethane composition, determined by use of a "Taber" abrader device Model 503-1 according to ASTM D1242, resulted in a weight loss of range 6–13.0 mg after 5000 cycles with a load of 1 kg, this being a superior result as compared to other commercially available floor covering materials.

The backside of the resultant coated composite was ground to a uniform flat surface and thickness of 150 mils to produce a finished floor tile.

Examples 2–7 show other useful polyurethane elastomer base formulations.

EXAMPLE 2

| Part A<br>Ingredient | Parts |
|---|---|
| Poly(oxypropylene) glycol having a molecular weight of 2000 | 30 |
| $SiO_2$ (2.8 micron average particle size) | 65 |
| Phenyl mercuric acetate catalyst | 0.14 |
| Butylated hydroxy toluene (sold under the trade designation "Ionol") | 0.095 |
| Part B<br>Ingredient | Parts |
| Polyphenylene polyisocyanate having an equivalent weight of 135 (sold under the trade designation "Mondur" MRS) | 4.8 |

EXAMPLE 3

Same as Example 2 but substituting the $SiO_2$ with an equal weight of calcium carbonate having a particle size less than 75 microns and a mean particle size of 12 microns.

EXAMPLE 4

| Part A<br>Ingredient | Parts |
|---|---|
| Poly(oxypropylene)glycol having a molecular weight of 2000 | 51 |
| $SiO_2$(2.8 micron average particle size) | 40 |
| Phenyl mercuric acetate | 0.14 |
| Part B<br>Ingredient | Parts |
| Polyphenylene polyisocyanate having an equivalent weight of 135 "Mondur" Mondur(MRS) | 8.7 |

EXAMPLE 5

Same as Example No. 4 but substituting the $SiO_2$ with an equal weight of calcium carbonate described in Example 3.

EXAMPLE 6

| Part A<br>Ingredient | Parts |
|---|---|
| [Poly(oxypropylene] | |

-continued

| | |
|---|---|
| Poly(oxypropylene) glycol having a molecular weight of 2000 | 16.3 |
| [Poly(oxypropylene] Poly(oxypropylene) triol having a molecular weight of 1500 | 13.2 |
| Butylated hydroxy toluene | 0.2 |
| Phenyl mercuric acetate | 0.17 |
| $SiO_2$(2.8 micron average particle size) | 62.86 |

Part B

| Ingredient | Parts |
|---|---|
| Toluene diisocyanate | 7.23 |

EXAMPLE 7

Same as Example No. 6 but substituting the $SiO_2$ with an equal weight of $CaCO_2$ described in Example 3.

What is claimed is:

1. A resilient wood replication especially suited for use as floor covering comprising in combination:

(1) a resilient polyurethane elastomeric base at least 30 mils thick and having a molded textured wood-grain surface, said polyurethane elastomer *elastomeric base* being formed of a precursor material which has an initial liquid state permitting it to be poured into a mold having the negative of a wood grain pattern and being capable of nearly perfectly reproducing a counterpart of the mold's surface upon curing, forming an elastomeric product which is flexible, durable and tough, resilient, water-resistant and resistant to permanent deformation at temperatures in the range of about −30° to +70° C. and having an elongation at break of at least 50%, a tensile strength of at least about 100 psi, a hardness value within the range of about 20 to 90 Shore A durometer, a compressive strength in the range of about 150 to 4000 psi at 50% deflection and a tear strength which exceeds 20 lbs. per inch thickness;

(2) sufficient wood stain applied over said molded textured wood-grain surface to make it resemble stained wood; and (3) a layer at least 1 mil thick of a clear, tough, abrasion-resistant, flexible, adherent polyurethane material overcoating the stained molded textured wood-grain surface.

2. The resilient wood replication of claim 1 wherein said elastomeric base contains up to about 75% by weight of a finely divided inorganic filler.

3. The resilient wood replication of claim 2 wherein said inert inorganic filler is selected from the group consisting of silica and dried calcium carbonate.

4. The resilient wood replication of claim 1 wherein said polyurethane elastomer is produced by the reaction product of poly(oxypropylene) polyol and an organic polyisocyanate with a suitable crosslinking catalyst.

5. The resilient wood replication of claim 1 wherein said polyurethane protective coating is produced by reacting [poly(oxypropylene) glycol] *polytetramethylene ether diol,* poly(oxypropylene) triol and [poly methylene poly phenyl isocyanate] *methylene bis(4,4'-cyclohexyl isocyanate)* in the presence of a suitable crosslinking catalyst.

6. The resilient wood replication of claim 1 wherein said polyurethane protective coating has an elongation of from about 200% to 600% and a tensile strength of at least about 1500 psi.

7. The resilient wood replication of claim 1 in the form of a floor tile.

* * * * *

UNITED STATES PATENT AND TRADEMARK OFFICE

CERTIFICATE OF CORRECTION

PATENT NO. : RE. 30,891

DATED : March 30, 1982

INVENTOR(S) : Eugene L. Baratto

It is certified that error appears in the above—identified patent and that said Letters Patent is hereby corrected as shown below:

Col. 4, line 66, "elastomeric" should read --elastomer--.

Col. 9, lines 23 and 24, "elastomer elastomeric base being" should read --elastomer being--.

Signed and Sealed this

*Twenty-fourth* Day of *August 1982*

[SEAL]

*Attest:*

GERALD J. MOSSINGHOFF

*Attesting Officer*

*Commissioner of Patents and Trademarks*